UNITED STATES PATENT OFFICE.

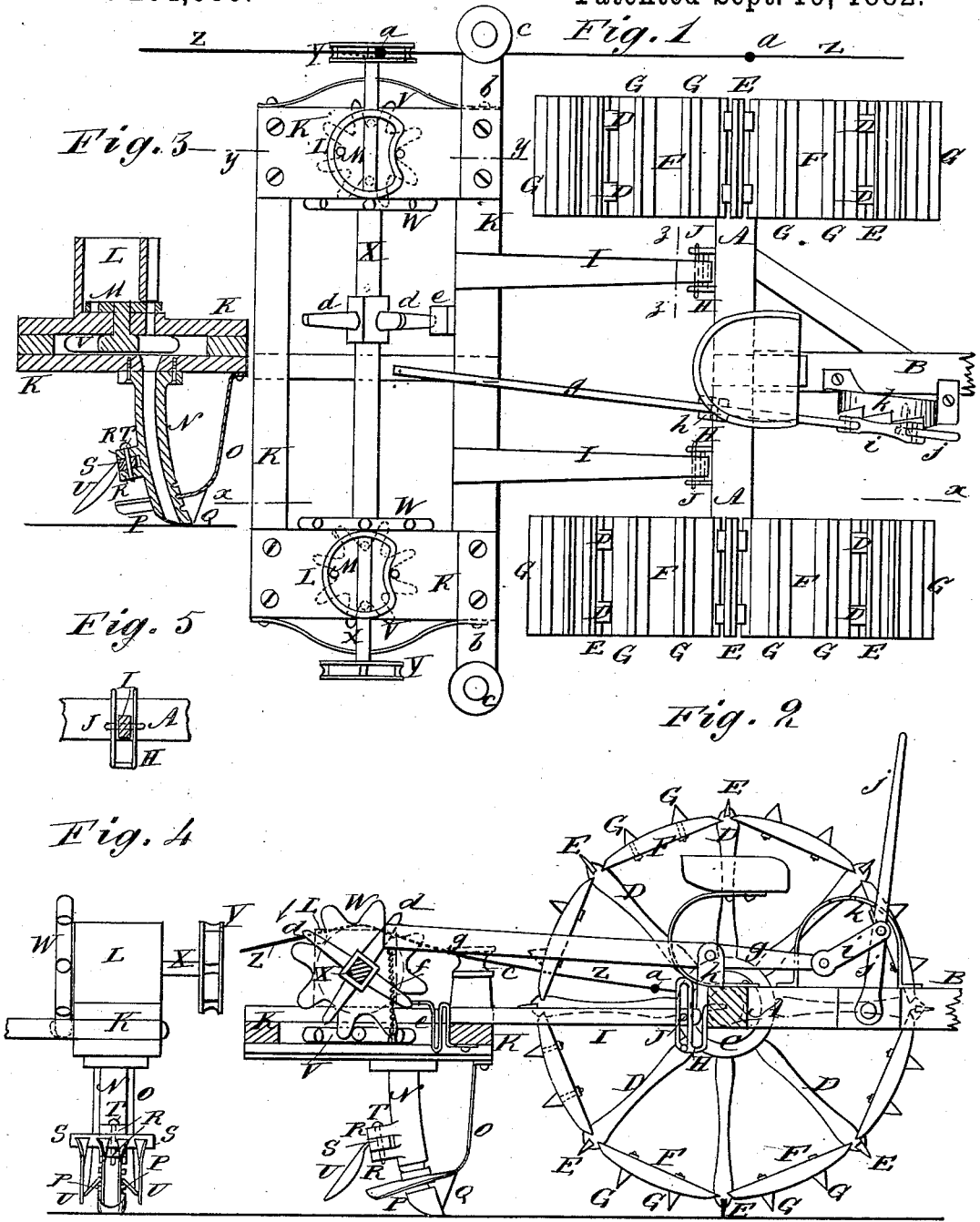

WILLIAM P. GARD, OF PARSONS, KANSAS.

SEED-PLANTER.

SPECIFICATION forming part of Letters Patent No. 264,686, dated September 19, 1882.

Application filed March 23, 1882. (No model.)

*To all whom it may concern:*

Be it known that I, WILLIAM PERRY GARD, of Parsons, Labette county, and State of Kansas, have invented a new and useful Improvement in Seed-Planters, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a sectional side elevation of the same, taken through the line $x\ x$, Fig. 1. Fig. 3 is a sectional side elevation of a part of the same, taken through the line $y\ y$, Fig. 1. Fig. 4 is a rear elevation of a part of the same. Fig. 5 is a sectional rear elevation of a part of the same, taken through the line $z\ z$, Fig. 1.

The object of this invention is to facilitate the preparation of the soil to receive seed, and also the planting of the seed.

The invention consists in the peculiar construction and arrangement of parts, as hereinafter fully described.

A is the axle, to the center of which is rigidly attached the tongue B. The hubs C of the drive-wheels are cast upon the inner ends of the spokes D, and in the outer ends of the said spokes are formed grooves, in which are secured knives E. In the sides of the outer ends of the spokes D are formed grooves, in which are secured the side edges of blocks F. The outer sides of the blocks F are curved upon the arc of a circle, and to them are secured knives G. With this construction, as the machine is drawn forward the knives E G pulverize the soil in the line of the rows of hills to be planted, so as to bring the soil into proper condition to receive seed.

To the rear side of the axle A, upon the opposite sides of its center, are attached the couplings H. The couplings H are formed with two vertical and parallel lugs at such a distance apart as to receive between them the forward ends of the connecting-bars I, and are slotted vertically to receive the bolt or pin J, that passes through the ends of the said bars I, so that the bars I can have a vertical play to adapt the machine for use upon uneven ground. The rear ends of the connecting-bars I are rigidly attached to the forward cross-bar of the planter-frame K, the side bars of which are made double and are attached to the upper and lower sides of the ends of the cross-bars.

To the middle parts of the upper side bars of the frame K are attached the seed-boxes L, which are made with inward offsets upon their forward sides.

In the bottom of each seed-box L is placed a seed-dropping wheel, M, which has perforations formed in it near its circumference, each perforation being of such a size as to contain enough seed for a hill. The outer part of the wheel M passes through a slot in the lower part of the offset of the seed-box, so that each perforation will carry its seed to the outer side of the said offset and allow the seed to drop through a perforation in the side bars of the frame K into the interior of the hollow foot N, the lower end of which serves as a plow to open a channel to receive the seed. The upper end of the foot N is attached to the lower side bar of the frame K.

Around the lower part of the foot N are formed three (more or less) annular grooves to receive the forked rear end of the gage O. The gage O projects forward, is bent upward, and its upper end is attached to the forward part of the frame K. With this construction the lower part of the gage O slides upon the ground and limits the depth to which the foot N enters the ground, so that by adjusting the forked lower end of the said gage in one or another of the grooves in the foot N the seed can be deposited at a greater or less depth in the ground, as may be desired.

Upon the rear ends of the forks of the gages O are formed, or to them are attached, plates P, which are inclined, curved, or otherwise formed to enter the soil and fill the channels opened by the feet N.

To the lower side of the gage O is attached the upper edge of a triangular plate, Q, the rear edge of which enters a vertical groove in the forward side of the lower part of the foot N, so that the inclined forward edge of the said plate Q will serve as a colter to open a passage for the foot N.

Upon the rear side of the foot N are formed two lugs, R, which are placed one above the other, and at such a distance apart as to receive between them a short bar, S, which is secured in place by a pin, T, passing through it and through the said lugs R.

To the bar S are attached downwardly-projecting teeth U, which are made of sufficient length to reach the surface of the ground and smooth off the top of the row.

The seed-dropping wheel M has a square hole in its center to receive the square upper end of the journal of the cog or gear wheel V, which meshes into a similar wheel, W, attached to the shaft X, so that the seed-dropping wheels M will be revolved by the revolution of the said shaft X. The shaft X revolves in bearings in the seed-boxes L, and to its ends are attached chain-wheels Y to receive the rope Z, stretched across the field, and which is provided with knots or knobs $a$ to operate the chain-wheels Y and drop the seed.

To arms $b$, attached to the forward corners of the planter-frame K, are pivoted pulleys $c$, to guide the rope Z in passing to and from the chain-wheels Y.

To the middle part of the shaft X is attached a four-armed wheel, $d$, the arms of which successively come in contact with a spring, $e$, attached to the forward part of the frame K, and which is made of sufficient strength to keep the shaft X from revolving before a knot of the rope Z comes in contact with the chain-wheel Y, so that the hills will be dropped at uniform distances apart.

To the middle part of the planter-frame K is attached the lower end of a short chain, $f$, the upper end of which is attached to the rear end of a lever, $g$. The lever $g$ is fulcrumed to the slotted upper end of a short standard, $h$, attached to the axle A.

To the forward end of the lever $g$ is hinged the lower end of a short connecting-bar, $i$, the upper end of which is pivoted to a lever, $j$. The lower end of the lever $j$ is fulcrumed to the tongue B. With this construction, by operating the lever $j$ the planter-frame K and its attachments can be readily raised from the ground for convenience in passing obstructions, turning around, and passing from place to place. The lever $j$ is held in place, when adjusted, by the teeth of an arched catch-bar, $k$, attached to the tongue B.

Having thus fully described my invention, what I claim as new, and desire to secure by Letters Patent, is—

1. In a seed-planter, the combination, with the grooved outer ends of the drive-wheel spokes D, of the knives E and the blocks F, carrying knives G, substantially as herein shown and described, whereby the soil in the line of the rows of hills will be pulverized, as set forth.

2. In a seed-planter, the combination, with seed-boxes L, the seed-dropping wheels M, the cog-wheel V, the chain-wheels Y, and the knotted rope Z, of the shaft X, provided with the cog-wheel W, and the radial arms $d$, and the spring $e$, substantially as and for the purpose set forth.

3. In a seed-planter, the combination, with the planter-frame K and the foot N, of the gage-plate O, having its lower end forked to receive the foot, and extended beyond the same to form coverers P and colter Q, secured to said gage-plate and foot, substantially as and for the purpose set forth.

WILLIAM P. GARD.

Witnesses:
D. N. CORNELIUS,
A. MILLER.